March 26, 1946.   R. WHITE   2,397,175
INSTRUMENT DIALS
Filed July 23, 1938   2 Sheets-Sheet 2

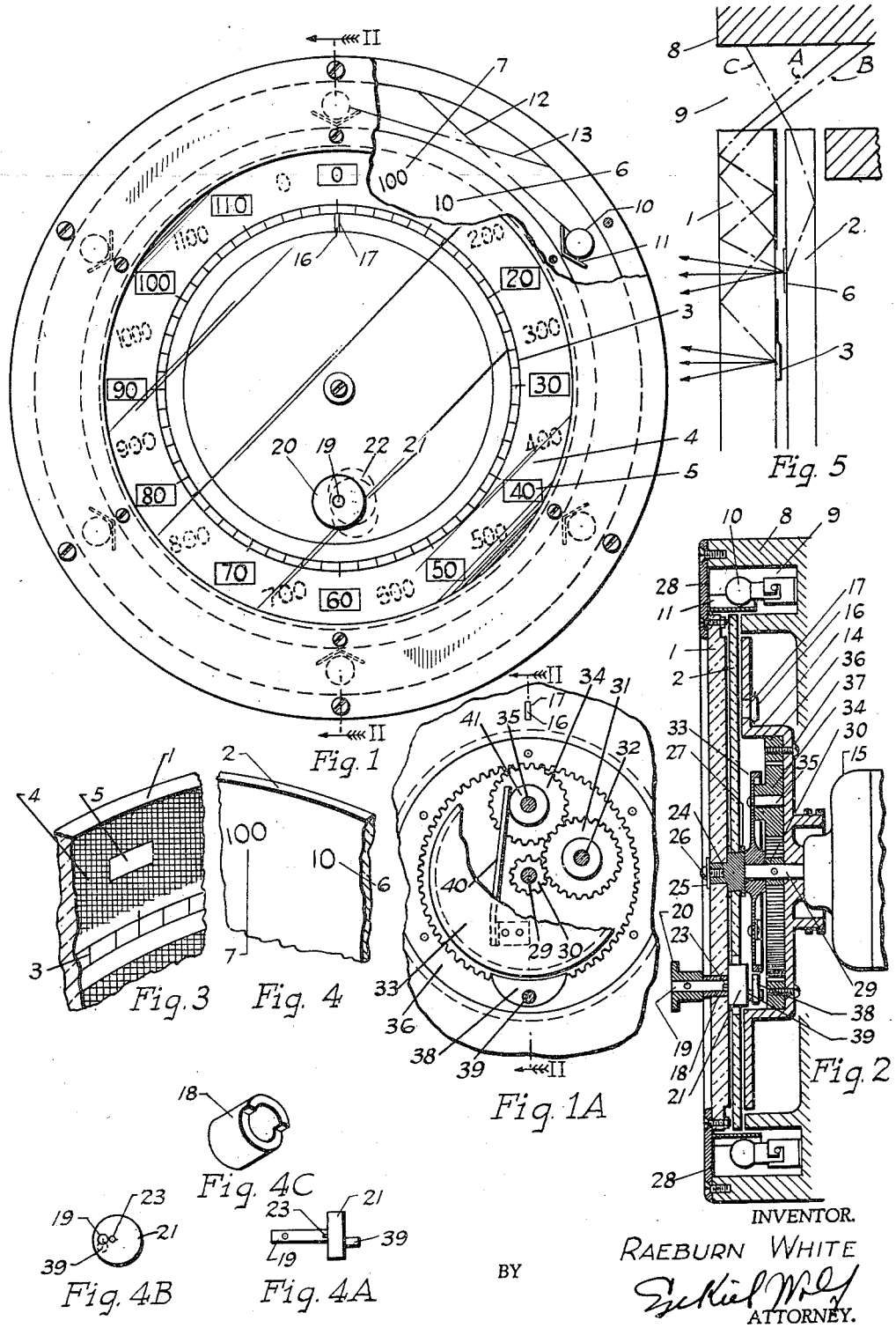

INVENTOR.
RAEBURN WHITE
BY
ATTORNEY.

Patented Mar. 26, 1946

2,397,175

UNITED STATES PATENT OFFICE 2,397,175

INSTRUMENT DIALS

Raeburn White, Boston, Mass., assignor to Submarine Signal Company, Boston, Mass., a corporation of Maine Application July 23, 1938, Serial No. 221,036

8 Claims. (Cl. 177—386)

The present invention relates to instrument dials and more particularly to dials for echo depth sounding indicators. The invention moreover relates to the indirect illumination of instrument dials and to means for changing the range of instrument scales from one set of indicia to another.

Figure 6:
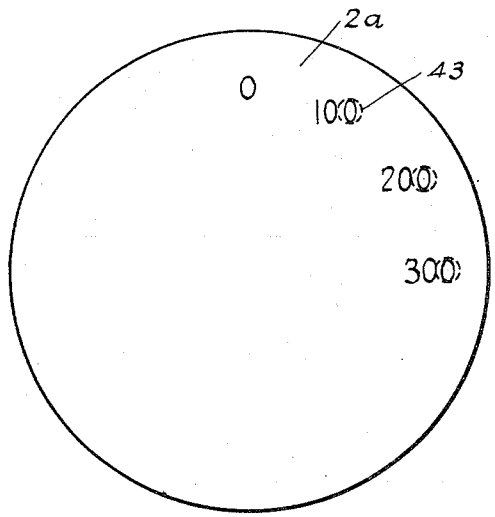
Figure 7:
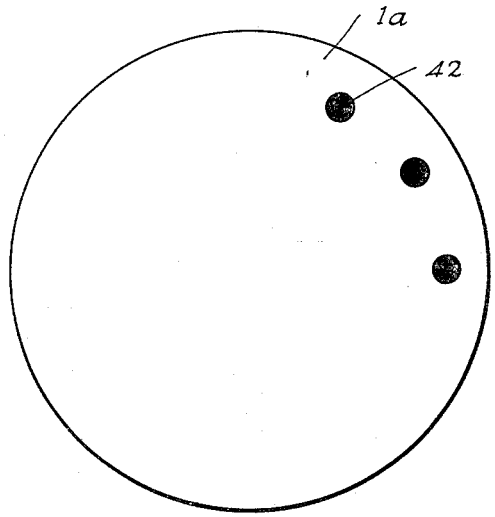
Figure 8:
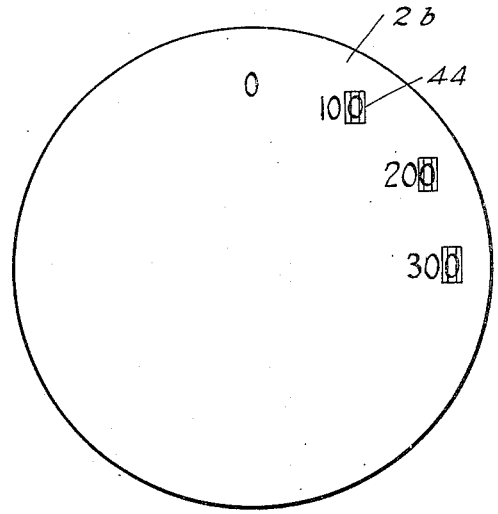
Figure 9:
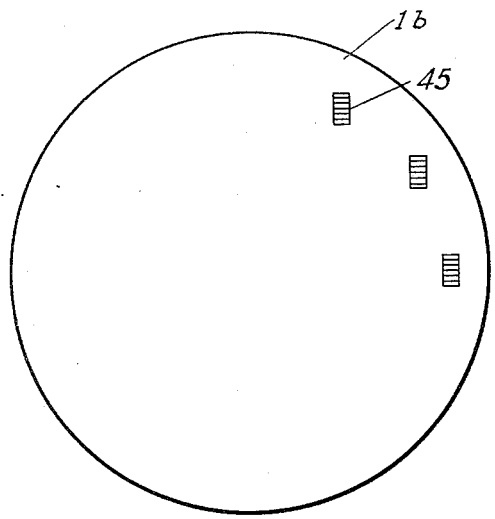

The objects of the invention will best be understood from the following description in connection with the accompanying drawings in which Fig. 1 is a front elevation of an instrument dial according to the present invention; Fig. 1A is a partial elevation of a speed-changing mechanism shown with dials and cover removed; Fig. 2 is a section taken along the line II—II in Figs. 1 and 1A; Fig. 3 is a perspective view showing a fragment of the back of the front dial; Fig. 4 is a perspective view showing a fragment of the front of the second dial; Figs. 4A, 4B and 4C show elements of the range-changing mechanism; Fig. 5 is an enlarged diagrammatic representation of the probable path of light rays illuminating the dials; Figs. 6 and 7 are front elevations of the back and front dials, respectively, of a modification of the range-changing system shown in Fig. 1; and Figs. 8 and 9 are front elevations of the back and front dials, respectively, of a modification of the range-changing mechanism shown in Fig. 1.

The instrument dial system according to the present invention as illustrated by the example shown in Figs. 1 to 5, inclusive, comprises two transparent dials 1 and 2, preferably circular in shape, supported close to one another with their axes coincident by means of a hub 24 shaped as shown in Fig. 2. The dial 1 is held against the shoulder of the hub by the washer 25 and the screw 26. The dial 2 bears against an outer flange 27 of the hub and is rotatably mounted thereon. The dial assembly is mounted in a frame 8 by means of a bezel 28 to which the dial 1 is secured. The bezel also serves to conceal from an observer the source of illumination as hereafter described.

Both dials may be made of glass or other suitable transparent material. The front dial 1 has secured to its back surface in intimate contact therewith a scale of graduations 3. Also applied to the back surface of the dial 1 is an annulus of an opaque material 4 having rectangular or other suitably shaped apertures 5 uniformly spaced and positioned to be adjacent important division marks along the scale 3. The scale graduations as well as the opaque material are preferably applied to the glass by the screen process of printing, since by this means great accuracy in the calibrations can readily be maintained and intimate contact secured between the pigment used and the surface of the glass.

The second dial 2 bears on its front surface one or more sets of indicia 6 and 7 which serve to assign values to the graduations of the scale 3. These indicia are also preferably printed on the surface of the dial by means of the screen printing process previously referred to and are formed of a pigment which is translucent. The individual numerals in each set of indicia are uniformly spaced and positioned so that one set at a time is directly in back of the apertures 5 in the opaque annulus on the first dial.

The dials are provided with indirect illumination by transmitting light into them through their edges. To this end the dials are recessed within a frame 8 having an annular channel 9 in which are mounted a plurality of relatively concentrated light sources 10 which conveniently are incandescent lamps. The interior surface of the channel 9 is preferably painted white or otherwise provided with a light-reflecting and dispersing surface. Between each lamp and the edges of the dials an angle shaped opaque reflector 11 is mounted. This reflector has two purposes; first, to prevent direct light from passing from the light source into the edges of the dials, and, secondly, to reflect incident direct light to the outer surface of the channel 9 as indicated by the dot-dash lines 12 and 13 of Fig. 1. The reflectors are preferably shaped and positioned to have a cut-off angle such that a straight line from the center of a light source and just grazing an edge of its reflector strikes the outer surface of the channel at approximately three quarters the distance from the light source to the adjacent light source. Thus, the outer surface of the channel 9 acts indirectly as the source of the light which passes into the dials through their edges to illuminate the indicia thereon.

A schematic representation of the manner in which this probably takes place is shown in Fig. 5. Light rays A and B, starting from the outer surface of the channel 9, strike the edge of the dial 1 and, entering the same, are reflected several times from the internal surfaces of the dial. A portion of the ray A finally passes out of the back surface of the dial 1 and strikes the indicia 6 which is secured to the front surface of the dial 2. Some of the light so striking the indicia 6 is reflected and dispersed and passes out through the dial 1 so that it can be seen by an observer. The indicia 6 is further illuminated by a light ray C which may pass directly into the dial 2 through its edge and, after one or more reflections from the internal surfaces of the dial, strike the indicia 6 and, since the latter is translucent, a portion will pass through it and through the dial 1 to the observer. The indicia 6 is thereby caused to appear to be self-luminous. The light ray B passing into the edge of the dial 1, after multiple reflections between the internal surfaces of the dial, may finally strike the graduations 3 which are secured to the back surface of the dial in intimate contact therewith. Some of this light will be dispersed and reflected out through the dial 1 to the observer whereby the graduations 3 also appear to be brightly illuminated. Some of the light after passing through the dial also reaches the opposite side of the channel and is reflected back into the dial again, thus further contributing to uniformity of illumination.

I have found that by means of the illumination system just described a circular dial may be uniformly illuminated with as few as six light sources uniformly spaced in the channel 9. The number of lamps required to produce uniform illumination depends, of course, somewhat upon the intensity of the lamps and the diameter and material of the dial which is to be illuminated.

An additional feature of my system of illumination is that since incandescent lamps are used, it is a very simple matter to control the intensity of the illumination simply by using a rheostat or potentiometer to control the voltage applied to the several lamps. This is of particular merit in the case of ship's instruments which are often desirably used on the bridge where at night bright lights can not be employed.

The illumination system just described can, of course, also be used where only a single dial is concerned, in which case both the scale of graduations and the indicia therefor, are secured in intimate contact with the back of the dial.

By means of the pair of dials in accordance with the present invention the instrument may be given a plurality of different ranges, the calibration for one range only being visible at a time. Moreover, the range-changing mechanism for the dials can readily be coupled to a range-changing mechanism for the instrument itself. This combination absolutely removes the possibility of error on the part of an observer in reading the instrument.

An example of such a structure is here shown as applied to an echo depth finding indicator. In echo depth finding systems as heretofore used a compressional wave signal is sent out by the ship towards the ocean bottom at a definite position of a rotating indicator such as a neon or other gaseous discharge tube. When the echo of the transmitted wave returns to the ship, the discharge tube indicator flashes, thereby disclosing the distance which it has moved since the transmitted wave was sent out, this angular distance being the measure of the depth.

Accordingly, as shown in Fig. 2, a disc 14, rotated at constant speed by a motor 15, carries a neon tube indicator 16 mounted on the disc 14 behind a slot 17 so that the discharge of the indicator may be observed from the front of the instrument. If the disc 14 be rotated at a relatively rapid rate, a complete revolution of the disc may correspond to the time interval required for the transmitted signal to travel to the ocean bottom and back to the ship in a depth of 120 fathoms. Therefore, the dial 2 is provided with indicia calibrating the scale 3 from 0 to 120 fathoms, the said indicia being observable through the apertures 5 in the dial 1. By rotating the disc 14 at a slower rate of speed, for example 1/10 the speed, one revolution of the disc 14 may correspond to the time interval between the transmitted wave and the echo in a depth of 1200 fathoms. There is, therefore, provided on the dial 2 a second set of indicia which calibrate the scale 3 from 0 to 1200 fathoms. The second set of indicia is, however, normally obscured by the opaque annulus 4 on the dial 1. To bring the second set of indicia into view, the dial 2 is rotated with respect to the dial 1 through an angle sufficient to bring the second set of indicia in line with the apertures 5 in the dial 1.

The rotating mechanism comprises a bushing 18 mounted in a hole in the dial 1 and having a cutaway portion shaped as shown in Fig. 4C. A shaft 19 passes through the bushing and has a knob 20 fixed to its outer end whereby the shaft may be turned by the operator. At the other end of the shaft 19 in back of the dial 1 there is mounted an eccentric cylindrical cam 21 which engages an oval slot 22 in the dial 2. Thus, rotation of the knob 20 brings about the rotation of the dial 2 with respect to the dial 1 through the angular distance required to shift from one set of indicia to the other. More than two sets of indicia may, of course, be employed if desired. Where, as in the present case, two sets of indicia are used, a definite stop in each of the two positions is provided by a pin 23 projecting from the cam 21 and arranged to engage the projecting ends of the bushing 18.

In order to avoid all possible source of error on the part of the observer of the instrument, it is desirable to change simultaneously and automatically both the range of the scale of the instrument and the range of the instrument itself.

As previously mentioned in the case of an echo depth sounder having a rotating indicator, a change in the range of the instrument is accomplished by changing the speed of the rotating indicator. According to the present invention the speed-changing mechanism is coupled to the dial range-changing mechanism. The constant speed driving motor 15 has fixed to its shaft 29 a pinion gear 30 which meshes with gear wheel 31 rotatably mounted on a shaft 32 fixed to a rotatable cover plate 33 which is, in turn, rotatably mounted on the motor shaft 29. The gear 31 meshes with gear 34 also rotatably mounted on a shaft 35 carried by the cover plate 33. The gear 34 meshes with an internal ring gear 36 fixed by screws 37 to the neon tube-carrying disc 14. A brake shoe 38 is mounted upon a shaft 39 eccentrically positioned on the cam 21, as shown in Figs. 2 and 4A, so that rotation of the knob 20 causes the brake shoe 38 to move towards and away from the flanged edge of the cover plate 33.

When the dials are set for the low depth range, the shoe 38 is out of contact with the cover plate 33 and the motor's torque is transmitted through the planetary gear system without rotation of the latter so that the plate 33 and consequently the disc 14 rotate at the full motor's speed. A leaf spring 40 secured to the cover plate 33 bears against a shoulder 41 on the gear 34 to provide sufficient friction to insure that the gears will not rotate relatively to each other. When, however, the knob 20 is turned so that the long range indicia are in place behind the apertures 5 on the dial 1, the shoe 38 makes contact with the cover plate 33 preventing rotation of the latter. The motor's torque then forces the gears 30, 31 and 34 to rotate whereby the ring gear 36 and consequently the indicator-carrying disc 14, are rotated at a fraction of the motor's speed, depending upon the gear ratio.

A modification of the arrangement previously described for changing the calibration range of the scale is shown in Figs. 6 and 7. In this modification the second dial 2a shown in Fig. 6 is provided with a single set of indicia only. The front dial 1a, on the other hand, is provided with a set of opaque areas 42 which upon the rotation of one dial with respect to the other may be brought into coincidence with one of the digits of each of the numerals on the dial 2a, as indicated in Fig. 6 at 43. When one or more of the digits of each numeral is thus obscured, the instrument is calibrated for a smaller range than when the whole numeral is visible.

A further modification is shown in Figs. 8 and 9. Here the back dial 2b, Fig. 8, has one or more of the digits of each of the numbers covered with a sheet of transparent light polarizing material 44, such as that known under the trade name of "Polaroid," with the light polarizing axes in a definite predetermined direction. The front dial 1b, Fig. 9, is then provided with a corresponding series of areas of light polarizing material 45 with the light polarizing axes in a direction at right angles to those of the light polarizing material on the dial 2b. Thus, when the two dials are superimposed so that the light polarizing areas are also superimposed, the calibration range of the dial will be smaller than when the areas 44 and 45 are not directly one behind the other.

The mechanism for rotating one dial with respect to the other in these modifications may, of course, conveniently be the same as that previously described and may be similarly coupled to the range-changing mechanism of the instrument itself.

Having now described my invention, I claim:

1. In an indicating instrument, an indicating dial having numerical indicia thereon and means for changing the observable values of said indicia including a second dial of transparent material positioned in front of the first dial and bearing means comprising a plurality of spaced spots of opaque material adapted to obscure at least one digit of each of said numerals and means for displacing said first dial with respect to the second for covering and uncovering said digits with said spots, whereby the indicated range of the instrument can be varied.

2. In an indicating instrument, an indicating dial having numerical indicia thereon and means for changing the observable values of said indicia including light-polarizing material disposed in front of at least one digit of each of said indicia, a second dial of transparent material positioned in front of the first dial and bearing a plurality of spaced areas of light-polarizing material, means for displacing said first dial with respect to the second for aligning the light-polarizing material on the second dial with the light-polarizing material in front of said digits so that the respective polarization planes are at substantially right angles to each other.

3. In an indicating instrument, an indicating dial having a plurality of sets of numerical indicia thereon and means for changing the observable values of said indicia including light-polarizing material disposed in front of said indicia, a second dial of transparent material positioned in front of said first dial and bearing light-polarizing material with the light-polarizing axes arranged to provide alternate polarizing and non-polarizing areas equal in number to the number of indicia in each set on said first dial and means for displacing one dial with respect to the other for aligning selected sets of indicia with the polarizing materials of both dials with their respective polarization planes at right angles to each other, whereby the indicated range of the instrument can be varied.

4. In an echo distance measuring instrument, the combination of a continuously rotating indicator, a stationary scale associated with said indicator, calibration indicia for said scale and means for simultaneously changing the speed of rotation of said indicator and the calibration indicia of said scale.

5. In an echo distance measuring instrument, the combination of a continuously rotating indicator, a circular scale positioned to cooperate with said indicator, a plurality of sets of indicia calibrating said scale, only one set of indicia being visible at a time, and means for changing the speed of rotation of said indicator and simultaneously, by the operation of said means, making visible a different set of said scale indicia.

6. In an echo distance measuring instrument, the combination of an indicator, means for continuously rotating the same, a mechanism for changing the speed of said indicator from one speed to another, said means including a rotatable shaft, a pair of discs, means positioning said discs with plane surfaces in close proximity to each other and in operative relation to said indicator, a circular scale on one disc positioned thereon in operative relation to said indicator, indicia on one of said discs, means including said shaft for rotating one of said discs with respect to the other through a predetermined angle, and means on at least one of said discs for effectively selecting in response to rotation of said disc, one or another group of said indicia for calibrating said scale in accordance with the speed of said indicator.

7. In an echo distance measuring instrument, the combination of an indicator, means for continuously rotating the same, a mechanism for changing the speed of said indicator from one speed to another, said means including a rotatable shaft, a pair of discs, one of said discs having an elongated aperture therein, means positioning said discs in close proximity to each other and in operative relation to said indicator, a circular scale on one disc positioned thereon in operative relation to said indicator, indicia on one of said discs, means for rotating one of said discs with respect to the other through a predetermined angle including an eccentric cam fixed to said shaft and positioned within said aperture, whereby rotation of said shaft rotates said apertured disc, and means on at least one of said discs for effectively selecting, in response to rotation of said apertured disc, one or another group of said indicia for calibrating said scale in accordance with the speed of said indicator.

8. In a measuring instrument, a scale calibration-changing mechanism including a pair of discs, one of which has an elongated aperture therein, means positioning said discs in close proximity to each other, a scale on one of said discs, indicia on one of said discs and means including an eccentric cam positioned in said aperture for rotating one of said discs with respect to the other through a predetermined angle and means on at least one of said discs for effectively selecting one or another group of said indicia for changing the calibration of said scale in response to rotation of said apertured disc.

RAEBURN WHITE.